May 11, 1954
L. BESCOCCA
2,678,362
DEVICE FOR AUTOMATIC CONTROL
Filed July 20, 1949
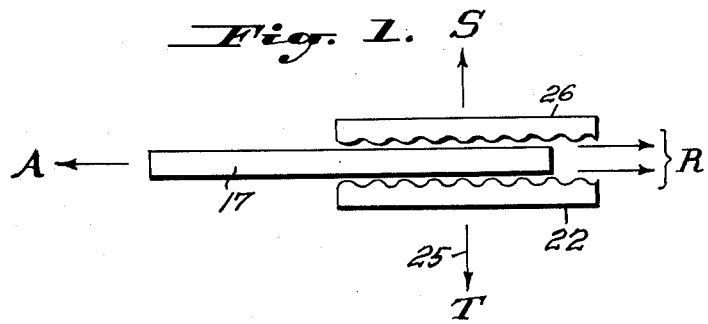
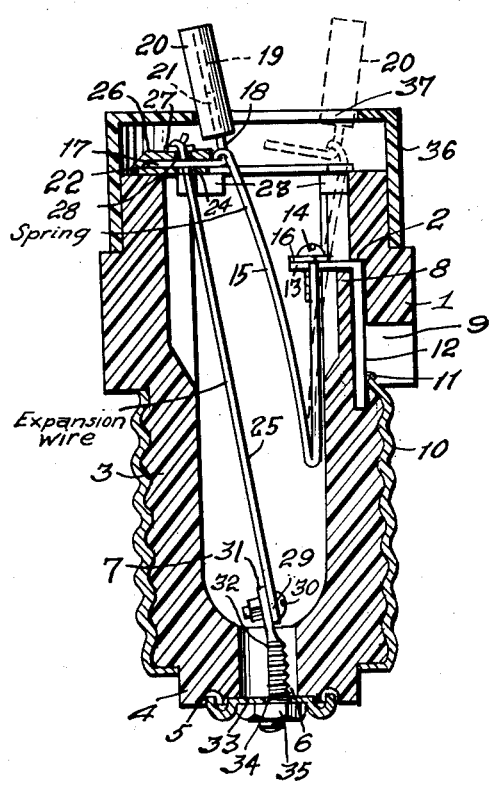
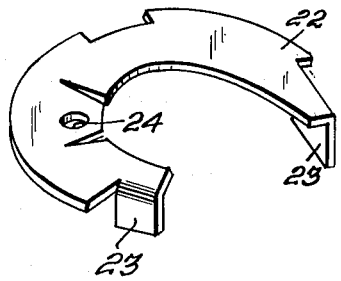
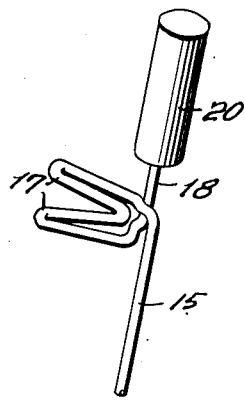
INVENTOR.
Luis Bescocca
BY
Cason K Downing Seebold
Attorneys.

Patented May 11, 1954

2,678,362

UNITED STATES PATENT OFFICE 2,678,362

DEVICE FOR AUTOMATIC CONTROL

Luis Bescocca, Buenos Aires, Argentina

Application July 20, 1949, Serial No. 105,882

7 Claims. (Cl. 200—113)

The present invention relates to an automatic control device. More particularly, the invention relates to a control device in which physical variations produced in one or more elements can be used to permit the movement of a movable member functioning to control an electrical circuit, a fluid circuit, a valve, an alarm or a signal.

The invention relates to an automatic control device in which a movable member is provided that is associated with means tending to move it in a predetermined direction by applying a force thereto and in which this member is retained in one position by other force applying means which apply force in opposition to the force tending to move the member. The movable member can control an electrical circuit or actuate a valve or carry out any other function of control desired.

More particularly, the invention relates to an automatic control device in which the means that hold the movable member against movement include a fixed element and a movable element constituting a clamp and means exerting a force of adjustable intensity on the movable element of the clamp in order to cause the clamp to frictionally retain the movable member in position and, more particularly, in which the means which exert this friction applying force includes a member which is automatically responsive to a predetermined condition to cause a variation in the clamping force exerted so that the friction applied against the movable member in opposition to the force exerted on that member is less than the force exerted on the member whereby the member immediately moves in the predetermined direction to effect its control action.

By way of example and for purposes of illustration only the accompanying drawings indicate an embodiment of the invention in which:

Figure 1 illustrates diagrammatically the basic principle of the invention,

Figure 2 is a cross sectional view of one application of the invention as applied to a circuit interrupter utilized in electrical installations, Figure 3 is a perspective view of the fixed element of the clamp shown in Figure 2, and Figure 4 is a detail of the upper portion of the control element constituting the movable member which is illustrated in Figure 2.

In the drawings and as diagrammatically shown in Figure 1 the control device includes the movable element or escape member 17 upon which a force denoted by the arrow A is exerted and which force normally tends to move the member 17 in its predetermined direction. The means for applying force to the element 17 can consist of a spring, an electro-magnet, a plunger pump or any other means normally tending to urge the element 17 in a predetermined direction. The retaining means or clamp to maintain the member 17 in one position includes the fixed element 22 and the movable element 26, the member 17 being retained between these elements by the frictional resistance exerted thereon which is denoted by the passive force R whose intensity is a direct function of a force T applied through an element denoted diagrammatically by the numeral 25, which element presses the movable element 26 against the fixed element 22.

It is particularly pointed out that if for any physical reason the force T diminishes until the frictional force R is inferior to the force A then the escape member 17 is immediately automatically moved responsive to the means normally urging it in the predetermined direction to accomplish its required function in the particular technical application in which the control device is utilized.

With regard to the embodiment of the invention shown in Figure 2 the same includes a body 1 of dielectric material which is similar in form to conventional fuse plugs and substantially cylindrical. One end of the body is externally reduced to provide a concentric step 2 that may be either smooth or threaded in order to receive a cap or closure member. The opposite end of the body is reduced externally to provide the projection 3 which is further reduced adjacent the end to provide the projecting portion 4 of a smaller diameter than the portion 3. The body is hollow and the end including the projecting portion 4 is provided with an axial opening 6 which communicates with the hollow chamber 7 formed within the body. A concentric groove or step 5 is provided on the outer surface of the part 4 for a purpose that will be later explained. The chamber 7 is widened at the upper end. The body is provided with a transverse aperture 9 which communicates with a groove or channel that opens into the interior of the body 7 adjacent a step having a planar upper surface 8 formed in the body. A substantially right angled small metallic plate 12 is disposed in the body with the long arm welded at 11 to an externally and internally threaded metallic ferrule 10 which is secured to the body portion 3 through cooperation with external threads provided on the body for that purpose.

The small arm 13 of the angular metallic plate 12 and which plate through its connection with the ferrule 10 constitutes an external electrical contact, rests upon the upper planar surface of the step 8. The small arm 13 is provided adjacent its free end with a threaded aperture through which is disposed a headed screw 14. A spring member 15 comprising two legs bent at an acute angle and made in the present example of metallic wire is removably associated with the contact plate 12. For this purpose the smaller leg of the wire spring 15 is provided with a loop 16 through which the screw 14 passes to fasten this end of the spring to the end or arm 13 of the plate 12. The other arm or leg of the spring 15 is provided with a laterally extending portion 17. As shown in the drawing the extension is fork-shaped to provide two fingers and the wire is bent back into substantial alignment with the longer leg of the spring 15 and terminates in a pin 18 embedded in an axial bore 19 provided in a handle 20. The pin 18 can be secured with relation to the handle 20 by means of resin or any other adhesive substance indicated at 21. As shown in Figure 2, the handle projects beyond the upper terminal end of the body 1 and also beyond the cover 36 secured thereto. The fixed element of the retaining means or clamp includes a metallic plate 22 which as shown in Figure 3 is in the form of a horse shoe provided with downturned wings 23 so that it may wedge against the internal circumference of the mouth of the body 1. The flat portion of the plate 22 rests on the upper ledge of the body 1 at the mouth thereof. An aperture 24 is provided in the plate 22 through which passes a wire 25 or a small pull rod and which wire or rod projects through an aperture provided in the movable member of the clamp 26 which is supported at a downturned portion against the flat portion of the fixed plate 22. The members 25 and 22 are normally spaced apart a distance sufficient to permit the insertion of the forked projections 17 of the spring 15 to be placed therebetween. The movable plate 26 is fastened by means of a pin 27 which passes through a ring or loop formed on the extremity of the wire or rod 25 and which pin 27 is disposed against the upper surface of the plate 26 and is of greater axial extent than the diameter of the aperture in the plate through which the wire or rod 25 passes. The opposite end of the wire or rod 25 is provided with a loop 29 which is fastened by means of a screw 30 to a bolt 31. The screw 30 can hold the wire 25 in position either by passing through a threaded aperture in the bolt 31 or, as shown, a bolt can be utilized to provide a nut and bolt connection of the wire 25 to the bolt 31. The bolt 31 is externally threaded and is of semi-circular cross section. The flat portion 32 passes through a washer 33 apertured at 34 corresponding in section to the bolt 31 and held against the step 5 so that the bolt 31 will not rotate when the nut 35 is rotated relative to the bolt 31 for tightening the wire 25 to thereby exert friction action on the forked end 17 of the spring 15 by clamping the same between the plate 26 and the fixed plate 22. The clamping pressure therefore is regulable in intensity by utilizing the nut 35 as an adjusting nut. The other end of the bolt 31 and the nut 35 constitute the central electrical contact of the device.

The lid 36 made of dielectric material closes the body 1 and is fastened to the reduced portion 2 and is provided with a radial opening 37 to accommodate the handle 20 and permit of the movement thereof.

It is obvious that in certain instances the support 22 which is shown as fixed can be replaced by a movable plate thus providing retaining means for the forked end 17 in the form of jaws.

The particular embodiment functions as follows: with the forked end 17 held between the plate 22 and the movable plate 26 and utilizing the device as a circuit interrupter an electrical circuit is formed between the contacts provided by the bolt 31 and the ferrule 10 through the wire 25, the contacting portions of the plate 22 with the forked end 17 of the spring, the remainder of the spring, the angled plate 12 to the ferrule 10. On an increase of the intensity of the current flowing through the wire 25 which intensity factor has been predetermined, the wire 25 functions as a resistor thereby expanding longitudinally on the increase of heat to diminish the pressure applied by the movable plate or pawl 26 against the forked arm 17. Upon diminishing of this pressure the arm 17 is immediately snapped from between the plates 22 and 26 under the action of the spring 15 or any other equivalent means utilized in order to open the circuit. Obviously and if desired, the movement of the projecting end of the handle 20 can be utilized for any desired purpose as for throwing a toggle switch or the like. The device is reset by manually moving the handle 20 to the left as shown in Figure 2 to reposition the forked arm 17 between the plates 22 and 26.

It is obvious that the theory and principles of the present invention can utilize any materials suitable for the particular purpose to which the device is to be put and the device is not intended to be limited other than by the scope of the appended claims.

Having thus described my invention, I claim:

1. In an automatic quick acting circuit interrupter, a hollow body, a conducting member inside the body, a contacting stud extending within the body, a current conducting shiftable member inside the body, an expansible member electrically connected with said stud and releaseably frictionally interconnected with said shiftable member, a conducting ferrule on the outside of the body and electrically connected with said conducting member, and a conductor spring electrically connecting the shiftable member and the ferrule through the conducting member, so that said shiftable member is frictionally held by said expansible member when the same is in its normal state and the circuit including said spring is closed, said expansible member expanding longitudinally upon a flow of current thereover in excess of a predetermined rate to relax the friction applied to said shiftable member whereupon said spring immediately shifts the shiftable member out of circuit making relationship with said expansible member to break the circuit.

2. An automatic quick acting circuit interrupter as defined in and by claim 1 in which the shiftable member and the spring are an integral structure.

3. An automatic quick acting circuit interrupter as defined in and by claim 1 in which adjustable tension applying means are associated with said expansible member and current conducting clamp means are disposed on opposite sides of a portion of said shiftable member and said expansible member through the action of said tension applying means applies force to said clamp means to frictionally retain said shiftable member in circuit making position.

4. An automatic control device including an escape member having a forked end having upper and lower surfaces, a movable jaw, a fixed jaw, said jaws being respectively engageable with said surfaces of said forked end, said jaws having substantially axially aligned apertures therethrough, the forks on the forked end of said member being disposable on opposite sides of the axis of said apertures, condition responsive means including an element passing through said apertures and operably associated with said movable jaw to apply pressure thereto to frictionally retain said member in position between the jaws, said means being operable in response to a predetermined condition to relax the friction, and means normally urging said escape member away from said jaws whereby upon the relaxation of the friction applied to said escape member the same immediately moves away from said jaws to perform a control function.

5. An automatic control device including a movable escape member, force applying means continually urging the member for movement in a predetermined direction, said movable escape member having an integral extension projecting laterally thereof, said force applying means constituting spring means integral with the escape member and the extension, retaining means in the form of a clamp including a displaceable jaw and a fixed jaw for normally retaining the extension of the escape member in position, said extension having opposite surfaces and said jaws frictionally engaging the said opposite surfaces, said movable jaw being displaceable perpendicularly with respect to the fixed jaw, force applying means consisting of a longitudinally adjustable expansible member for normally holding the displaceable jaw in frictional engagement with said extension and pressing the same against said fixed jaw, said jaws having axially aligned apertures therein and said expansible member passing through said apertures and operatively engaging the outer surface of the displaceable jaw whereby friction is applied to both surfaces of the extension sufficient to normally retain the same in position between the jaws, the value of said retaining friction being variable in accordance with the conditions to be controlled.

6. In an automatic quick acting circuit breaker as defined in and by claim 1, an element extending from said shiftable means and movable therewith, said element being operable as an auxiliary control device and also constituting a handle for moving the shiftable means to circuit closing position.

7. A switch control device including in combination a movable escape member including a lateral extension, spring means integral with said escape member and normally urging said escape member for movement in a predetermined direction, retaining means cooperable with said escape member to normally retain the same in a fixed position against the action of said spring means, said retaining means comprising two spaced clamp elements, one of said clamp elements being fixed and the other of said clamp elements being movably supported and cooperable with the first element so as to receive the extension of the escape member therebetween, means cooperatively connected with and applying force to the movably supported clamp element to frictionally retain the extension of and thereby the escape member in said fixed position, said force applying means including an expansible element automatically increasing in length in response to a predetermined condition whereby upon an increase in length thereof the friction exerted by said retaining means is released and said escape member automatically moves from said fixed position and said escape member and at least one of said clamp elements constituting cooperating contact elements of an electric switch.

References Cited in the file of this patent

UNITED STATES PATENTS

| Number | Name | Date |
|---|---|---|
| 1,899,915 | Matthews | Feb. 28, 1933 |
| 2,044,448 | Rivers | June 16, 1936 |

FOREIGN PATENTS

| Number | Country | Date |
|---|---|---|
| 191,782 | Germany | Oct. 8, 1907 |
| 258,553 | Italy | May 2, 1928 |
| 383,105 | Germany | Oct. 10, 1923 |